United States Patent [19]

Holtrop et al.

[11] Patent Number: 4,621,013

[45] Date of Patent: * Nov. 4, 1986

[54] THERMOFORMABLE LAMINATE STRUCTURE

[75] Inventors: James S. Holtrop, South Windsor, Conn.; Richard P. Maurer, Wilbraham, Mass.

[73] Assignee: Monsanto Company, St. Louis, Mo.

[*] Notice: The portion of the term of this patent subsequent to Dec. 18, 2001 has been disclaimed.

[21] Appl. No.: 647,095

[22] Filed: Sep. 4, 1984

Related U.S. Application Data

[63] Continuation-in-part of Ser. No. 553,594, Nov. 21, 1983, Pat. No. 4,476,183, and a continuation-in-part of Ser. No. 553,462, Nov. 21, 1983, Pat. No. 4,489,126.

[51] Int. Cl.$^4$ .......................... B32B 5/18; B32B 5/28
[52] U.S. Cl. .................... 428/245; 428/286; 428/288; 428/296; 428/304.4; 428/319.7
[58] Field of Search ............... 428/245, 246, 252, 260, 428/284, 286–288, 296, 304.4, 316.6, 317.1, 317.5, 317.7, 318.4, 319.3, 319.7, 319.9

[56] References Cited

U.S. PATENT DOCUMENTS

| | | | |
|---|---|---|---|
| 3,303,086 | 2/1967 | Demers | 428/319.3 |
| 3,355,535 | 11/1967 | Hain et al. | 264/321 |
| 3,531,367 | 9/1970 | Karsten | 428/317.7 |
| 3,565,746 | 2/1971 | Stevens | 428/316.6 |
| 3,654,063 | 4/1972 | Blackburn et al. | 428/304.4 |
| 3,787,259 | 1/1974 | Kleinfeld et al. | 156/78 |
| 3,817,818 | 6/1974 | Riding et al. | 428/316.6 |
| 3,833,259 | 9/1974 | Pershing | 428/316.6 |
| 4,065,596 | 12/1977 | Groody | 428/215 |
| 4,147,828 | 4/1979 | Heckel et al. | 428/255 |
| 4,167,824 | 9/1979 | Wolpa | 428/316.6 |
| 4,256,797 | 3/1981 | Stamper et al. | 428/224 |
| 4,305,985 | 12/1981 | Heublein | 428/283 |
| 4,388,363 | 6/1983 | Fountain | 428/215 |
| 4,476,183 | 10/1984 | Holtrop et al. | 428/286 |
| 4,486,492 | 12/1984 | Ziliotto | 428/252 |
| 4,489,126 | 12/1984 | Holtrop et al. | 428/246 |

FOREIGN PATENT DOCUMENTS

| | | | |
|---|---|---|---|
| 2906259 | 8/1980 | Fed. Rep. of Germany | 428/319.7 |
| 891943 | 3/1962 | United Kingdom | 428/296 |
| 970070 | 9/1964 | United Kingdom | 428/288 |
| 1149305 | 4/1969 | United Kingdom | 428/314.4 |

*Primary Examiner*—William J. Van Balen
*Attorney, Agent, or Firm*—Thomas E. Kelley

[57] ABSTRACT

A moisture resistant, moldable, thermoformable laminate structure comprising a layer of foamed thermoplastic material having a polymer-impregnated cloth bonded to one surface thereof.

6 Claims, No Drawings

THERMOFORMABLE LAMINATE STRUCTURE

This application is a continuation in part of applications Ser. Nos. 553,594 and 553,462, both filed Nov. 21, 1983 and incorporated herein by reference, now U.S. Pat. Nos. 4,476,183 and 4,489,126 respectively.

This invention relates to thermoplastic materials, and particularly to a thermoformable laminate structure comprising foamed thermoplastic sheet which may be molded into complex shapes. More particularly this invention relates to a thermoformable laminate structure having a coating formed from a fabric which is impregnated with a polymer which has a high softening temperature.

BACKGROUND OF THE INVENTION

Foamed thermoplastic laminates have been used for many years. These laminates were most often formed as a sandwich structure in which the foamed thermoplastic material was enclosed between liner board facings. An example of this construction is a polystyrene foam sheet which has a kraft liner board facing on each side. This laminate has been used by die-cutting and scoring or by pressing the board and applying a resin to fix the pressed shape. However, the kraft liner board facing is a paper material which is not easily molded and which has a tendency to wrinkle during any molding of the laminate structure.

Other efforts have been made to provide a laminate structure which may more easily be molded. A thermoplastic laminate has been formed of a layer of foamed styrene-maleic anhydride polymer to which a thermoplastic polymer skin is bonded. This laminate is moldable without the problems caused by the earlier developed paper facings.

More recent efforts have provided laminate structures formed of molded fiberglass which contains a phenol-formaldehyde polymer as a binder. A rayon scrim is attached to one side of a fiberglass batt and is compression molded to the desired shape

SUMMARY OF THE INVENTION

It is an object of this invention to provide a moldable thermoformable laminate structure.

It is a further object of this invention to provide a moisture-resistant, moldable, thermoformable laminate structure formed from a foamed thermoplastic sheet which has a polymer impregnated fabric on one face.

It is yet another object of this invention to provide a moisture-resistant, moldable, thermoformable laminate structure formed from a layer of foamed thermoplastic material which is faced by a fabric impregnated with an acrylic polymer having a high softening temperature.

An additional object of this invention is to provide a method for fabricating the moisture-resistant, moldable, thermoformable laminate structure.

These and other objects are obtained by the thermoformable laminate structure of this invention and the method of fabrication described hereinafter.

This invention provides a thermoformable laminate comprising a foamed thermoplastic sheet having adhered to one side a polymer-impregnated cloth. Desirably the cloth comprises synthetic fibers and readily elongates in any direction in its surface. The cloth is impregnated with a polymer has a softening temperature greater than 75° C.

Such thermoformable laminates are useful in providing molded laminate sheets by thermoforming methods. The thermoformable laminates of this invention are particularly useful in providing composite laminate structures which are moldable into complex shapes, for example for use as an automobile headliner, which is the covering for the interior surface of an automobile roof. Such composite laminate may utilize the thermoformable laminate of this invention in conjunction with other layers to provide a composite laminate with enhanced sound-adsorbing qualities. Such composite laminates are disclosed in copending application Ser. No. 553,594, filed Nov. 21, 1983, U.S. Pat. No. 4,476,183 incorporated herein by reference.

DESCRIPTION OF PREFERRED EMBODIMENTS

The thermoformable laminate of this invention comprising a foamed thermoplastic sheet having adhered to one side a polymer-impregnated cloth is preferably fabricated utilizing a polymer having a softening temperature of at least 75° C.

The foamed thermoplastic sheet can comprise a variety of foamable thermoplastic materials for instance polystyrene, styrene copolymers such as styrene-maleic anhydride polymer and styrene-acrylonitrile polymer, and the like. Foamed thermoplastic material may also comprise other foamable thermoplastic material which would be substantially rigid at moderate temperatures for instance polyolefins such as polyethylene. However, adhesion to polyethylene is generally difficult without surface treatment such as flame treating. The preferred material for providing the foamed thermoplastic sheet useful in a laminate of this invention comprises polystyrene or copolymers of polystyrene which are thermoformable at temperatures up to about 180° C.

The foamed thermoplastic sheet can be provided in any thickness desired. Foamed thermoplastic sheet which is particularly useful in the laminate of this invention will generally be less than 30 millimeters in thickness. The preferred thickness of the foamed thermoplastic sheet for use in fabricating composite laminates will generally be between 2 millimeters and 20 millimeters.

The thermoformable laminate of this invention has a polymer-impregnated cloth adhered to one side of the foamed thermoplastic sheet. The polymer-impregnated cloth provides stability to the laminate, for instance a composite laminate, which has been thermoformed into a complex shape.

Thermoforming of such laminates can be accomplished by preheating the laminate to a temperature at which the foamed thermoplastic material readily thermoforms without foam collapse. It is generally convenient to measure surface temperature of the preheated laminate prior to thermoforming. When styrenic foamed material is used, the surface temperature of the laminate should generally be above 120° C., below which the laminate may be thermoformable but susceptible to cracking or surface wrinkling. When styrenic foamed material is used, the surface temperature should be low enough to avoid foam collapse, for instance about 150° C. for polystyrene foam and 180° C. for styrene-maleic anhydride copolymer foam.

For purposes of this invention the term "softening temperature" is intended to mean softening point as determined by thermomechanical analysis using a program designated "TADS TMS Std TEV01.04 PCN 05.06B01.01.04" provided by Perkin Elmer using a Perkin Elmer: Model TMS2, Thermomechanical Analyzer. Analytical parameters were: probe load: 10 grams; minimum temperature: 25° C.; maximum temperature: 200° C.; heating rate: 5° C. per minute; cooling rate: 20° C. per minute; penetration probe: round tip. Polymer samples were approximately $\frac{1}{4}$ inch×$\frac{1}{8}$ inch×1/16 inch (6.35 mm×3.18 mm×1.6 mm). Thermomechanical analysis comprises placing a weighted compression probe on a thin sample which is slowly heated at a uniform rate. The temperature at which the probe begins to penetrate the sample is the softening point which is determined by the intersection of tangent lines about the inflection point on the plot of penetration distance versus temperature near the temperature at which the probe begins to penetrate the sample. Polymers useful in the process of this invention will have a softening temperature greater than 75° C. but lower than the minimum thermoforming material, for instance about 130° C. or up to about 180° C.

The cloth can comprise a variety of textile structures for instance the cloth may be woven or non-woven. A desired characteristic of the cloth is that it elongates sufficiently in a direction in its surface to conform to the desired complex shape to be imparted by the thermoforming process. Desirable cloth will comprise a fabric that can elongate, for instance in the range of about 10-50 percent, at thermoforming temperature without destroying integrity of the fabric structure. Woven cloths of natural or glass fibers generally exhibit elongation of less than 10 percent. Preferred cloth which can undergo such elongation comprises non-woven fabric such as non-woven spunbonded polyester fabric. Other cloths which may be useful include non-woven polyester, non-woven nylon and non-woven polypropylene. The cloth can have any thickness which may be desired. Typically useful cloth will have a thickness in the range of 0.05 to 1.0 millimeters. However, cloth having a larger thickness may be used. Preferably cloth will be non-woven and have a thickness of foam 0.1 to 0.4 millimeters. Typecally useful cloth will also have a basis weight in the range of 0.3 to 10.0 ounces per square yard (10-340 grams per square meter), preferably in the range of 1.0 to 6.0 ounces per square yard (34-203 grams per square meter).

The polymer-impregnated cloth can be prepared by soaking the cloth in a solution of polymer and solvent, for instance cloth can be pulled through a vat of a solution and then through a set of rolls to remove excess solution. The cloth can be dried to remove excess solvent and then adhered to one side of the foamed thermoplastic sheet. The adhesion can be effected by any adhesive that will bond the polymer-impregnated cloth to the foamed thermoplastic sheet. Preferably the adhesive will not exhibit creep at low temperatures for instance below the softening temperature of the foam. Acrylic adhesives are useful for this purpose.

Desirable soluble polymers include those polymers which are designated in commerce as resins. Polymers that are soluble in liquids such as water and lower alcohols such as methanol, ethanol, N-propanol, etc. are preferred. The most preferred polymers are those which are soluble in water, for instance solutions of water and ammonia. Such resins include acrylic resins, such as styrene-methacrylic acid copolymers. One such acrylic resin which is soluble in a water-ammonia solution is available from S. C. Johnson & Son, Inc as Joncryl 678 acrylic resin, which has a softening temperature of 89° C.

Other resins such as a phenolic resin may also be used. When a phenolic resin is used instead of the preferred acrylic resin the fabrication process must be modified to prevent a complete cure of the phenolic resin before the laminate structure is molded into the desired final shape. When the phenolic resin is completely cured it is no longer moldable; thus, during the preparation of the laminate structure, the phenolic resin impregnated fabric must be only partially cured. It must remain partially cured until the final molding step. The use of an acrylic resin, which is preferred, eliminates the handling problems such as storage to prevent curing and emission of volatile materials which are associated with the use of a phenolic resin. The coating is bonded to one of the surfaces of the layer of foamed thermoplastic material. This may be accomplished by heat treatment during the laminating or by an adhesive which is preferably water dispersed.

Such acrylic resins must also of course exhibit a softening temperature greater than about 75° C. Such high softening temperature allows for a stable laminate especially for uses where local temperatures may become moderately high.

Alternatively the thermoformable laminate of this invention can be prepared by applying a polymer emulsion film to the foamed thermoplastic sheet. A cloth can then be adhered to the wet polymer emulsion film.

This polymer emulsion film method is generally more economical in that substantially lower quantities of polymer are required to form a laminate. For instance, it has been found that less than 16 grams (for instance, about 5 to 8 grams) of polymer is required per square meter of laminate by this alternative polymer emulsion film method. On the other hand it has been generally found that about 40.0 grams of polymer are utilized per square foot of laminate when the cloth is soaked in a polymer solution. The cloth can be laid over the polymer emulsion film. The composite of cloth, polymer emulsion film and foamed thermoplastic sheet can then be calendered to force the polymer emulsion film to penetrate the cloth. The laminate can be formed by allowing the solvent to evaporate from the polymer emulsion at the outer surface of the cloth.

Alternatively the polymer emulsion film overlaying a surface of the foamed thermoplastic sheet can be allowed to dry prior to application of the cloth. The cloth can be applied to the dry film and the laminate formed by the application of heat and pressure. For instance a hot surface having a temperature of about 120° to 150° C. can be pressed on the cloth to cause the polymer film to penetrate into and impregnate the cloth.

A suitable polymer emulsion may contain an adhesive to promote adhesion of the polymer emulsion film to the foamed thermoplastic sheet. Such adhesive can comprise an acrylic adhesive such as is available from Rohn and Haas as E2138 acrylic adhesive or E1958 acrylic adhesive. Such adhesive can be mixed, for instance, in equal volumetric proportions, with the acrylic emulsion, such is available from S. C. Johnson & Son, Inc. as Joncryl 89 styrenated acrylic dispersion, a water based emulsion of about 48 percent by weight acrylic solids having a softening temperature of 101° C. The following structures illustrate laminate structures made in accordance with this invention.

EXAMPLE I

This example ilustrates a method of forming the laminate structure of this invention.

A mixture of polymer emulsion was prepared by combining equal weights of two aqueous acrylic emulsions.

The first aqueous acrylic emulsion was identified as Joncryl ™ 89 styrenated acrylic dispersion (available from S. C. Johnson & Son, Inc., Johnson Wax Chemical Products Division) which comprises 48±1 percent by weight solids in water at a pH in the range of 8.0 to 8.5. The emulsion has a milky appearance, a viscosity in the range of 400 to 600 centipoises and a density of 8.7 pounds per gallon (1.04 g/cm$^3$).

The second aqueous acrylic emulsion was identified as adhesive E-2138 (available from Rohm and Haas Company) which comprises 51 to 53 percent by weight acrylic polymer in water at a pH in the range of 8.2 to 8.6. The emulsion has a milky-blue color, a mild ammoniacal odor due to about 25 ppm of ammonia, and contains about 0.5 ppm of formaldehyde. The emulsion has a viscosity in the range of 40,000 to 50,000 centipoises.

The mixture of the two acrylic polymer emulsions was applied in a thin film to one surface of a sheet of polystyrene foam having a thickness of about 130 mils (3.3 mm) and a density of about 42 pounds per thousand square feet (205 grams per square meter). The film was applied at a thickness of about 0.75 mil ($19 \times 10^{-6}$ m) with a No. 8 stainless steel metering rod comprising No. 8 wire (having a diameter of 0.162 inches (4.1 mm)) wound on a rod having a diameter of ½ inch (about 13 mm). The emulsion film was applied at about 1.5 pounds per thousand square feet (7 gm/m$^2$).

While the film was still wet, a piece of spun-bonded, non-woven polyester fabric was laid onto the emulsion coated surface of the polystyrene foam. The polyester fabric had a basis weight of 1.0 ounces per square yard (33.9 gm/m$^2$) and is identified as Reemay 2014 by duPont.

The fabric was then laminated to the polystyrene foam in a Wabash Hydraulic Press, Model 50-2424-2 STMA, by which Metal Products, Inc., having steam heated plates set for a temperature of 260° F. (127° C.). The press was equipped with shims which provided a forming cavity in which the foam was allowed to expand. The wet laminate was heated within the press for 30 seconds, after which the press was cooled for about 90 seconds to a temperature of about 100° F. (38° C.). The laminate sheet then had a thickness of about 150 mils (3.8 mm).

The polyester fabric was laminated to the polystyrene foam with good adhesion. Adhesion can be determined by pulling the fabric to effect delamination. If fibers from the non-woven fabric separate from the fabric and are left adhered to the foam, adhesion is considered excellent. If there is delamination with no fibers left on the foam, adhesion is considered good.

EXAMPLES II-V

The lamination procedure of Example I was repeated using a variety of non-woven fabrics.

II. Fabric: non-woven polypropylene having a basis weight of 68 gm/m$^2$.
  Adhesion: good.
III. Fabric: non-woven polypropylene having a basis weight of 105 gm/m$^2$.
  Adhesion: good.
IV. Fabric: non-woven polyester having a basis weight of 163 gm/m$^2$.
  Adhesion: excellent.
V. Fabric: non-woven polyester having a basis weight of 197 gm/m$^2$.
  Adhesion: excellent.

Although adhesion was only good in the laminates of Examples II and III, such laminates would be acceptable and suitable for less severe applications.

EXAMPLE VI

This example illustrates the thermoformability of the laminate structure of this invention as prepared in Example 1.

The laminate structure prepared in Example 1 was thermoformed in a Comet thermoformer, Labmaster Model 14×20, by Comet Industries, Inc. The three-dimensional mold was of a design representing a seat buckle cover as used in some General Motors automobiles. The thermoformer operates by carrying the flat laminate sheet into an infrared heater section to preheat the flat laminate sheet to a thermoforming temperature for the material of the sheet so that the sheet can be readily formed. The sheet was in the heater section for 8 seconds where it reached a surface temperature in the range of 260° to 290° F. (127°-143° C.). The heated sheet was then moved into the open mold block which was heated to 70° F. (21° C.). The cooled molded laminate had good three-dimensional definition with no signs of delamination and no wrinkles.

EXAMPLES VII-X

The thermoforming procedure of Example VI was repeated using the laminate structures prepared in Examples II-V.

VII. Thermoforming of the laminate sheet prepared in Example II. The cooled molded laminate had good three-dimensional definition, but the polypropylene fabric partially delaminated from the polystyrene foam.
VIII. Thermoforming of the laminate sheet prepared in Example III. The cooled molded laminate had good three-dimensional definition, but the polypropylene fabric partially delaminated from the polystyrene foam.
IX. Thermoforming of the laminate sheet prepared in Example IV. The cooled molded laminate had good three-dimensional definition with no signs of delamination and no wrinkles.
X. Thermoforming of the laminate sheet prepared in Example V. The cooled molded laminate had good three-dimensional definition with no signs of delamination and no wrinkles.

Although there was some delamination and wrinkles in the laminates thermoformed in Examples VII and VIII, such laminates comprising polypropylene fabric would be suitable for applications requiring less severe thermoforming, for instance, such as automobile headliners where the thermoforming mold would not draw as deeply or at sharp angles.

EXAMPLE XI

This example illustrates an alternative method of producing the thermoformable laminate structure of this invention.

A bath of acrylic polymer solution was prepared using Joncryl ™ 61LV acrylic resin solution (available from S. C. Johnson & Son, Inc.) which has the following formulation:

acrylic resin—35.0 weight percent
28% aqueous ammonia—7.5 weight percent ethylene glycol—1.5 weight percent
isopropyl alcohol—5.0 weight percent
water—51.0 weight percent The acrylic resin component had a softening temperature of 85° C.

The acrylic polymer solution was diluted with water to an acrylic resin level of 27 percent by weight.

A sheet of spunbonded non-woven polyester fabric was soaked in the bath to impregnate the fabric with the acrylic polymer solution. Excess solution was removed by passing the fabric through a pair of rubber-coated squeeze rolls. The fabric was then placed in an oven at 180° F. (82° C.) for five minutes to remove liquids providing a dried polymer impregnated fabric, which comprised about 50 percent by weight acrylic polymer.

A sheet of polystyrene foam having a thickness of about 130 mils (3.3 mm) and a density of about 42 pounds per thousand square feet (205 grams per square meter) was coated on one surface with an aqueous acrylic emulsion identified as adhesive E-1958 (available from Rohm and Haas Company) which comprises 57 to 59 percent by weight acrylic polymer in water at a pH in the range of 4.0 to 5.0. The emulsion has a milky-white color, a mild acrylic odor. The emulsion has a Brookfield viscosity in the range of 2,000 to 4,000 centipoises. A catalyst solution of 15 percent by weight of sesquicarbonate (equimolar amounts of sodium bicarbonate and sodium carbonate) was added to the emulsion at a level of 4 parts per 100 parts of the emulsion. The catalyzed emulsion was applied to the surface of the polystyrene foam with a No. 8 stainless steel metering rod comprising No. 8 wire (having a diameter of 0.162 inches (4.1 mm)) wound on a rod having a diameter of 1.2 inch (13 mm) and allowed to dry.

The dried polymer impregnated fabric was applied to the surface of polystyrene foam coated with dried acrylic emulsion. Lamination was effected in a Wabash Hydraulic Press, Model 50-2424-2 STMA, by Metal Products, Inc. The press had steam heated plates at a temperature of 260° F. (127° C.) which were spaced apart by shims to provide a forming cavity in which the polystyrene foam was allowed to expand. The laminate was heated within the press for 30 seconds, after which the press was cooled for about 90 seconds to a temperature of about 100° F. (38° C.). The dry laminate structure then had a thickness of about 150 mils (3.8 mm).

EXAMPLE XII

The thermoforming procedure of Example VI repeated using the laminate structure prepared in Example XI. The cooled molded laminate had good three-dimensional definition with no wrinkles.

USES OF THE THERMOFORMABLE LAMINATE

The thermoformable laminate sheet of this invention is useful in preparing molded thermoplastic foam articles.

Such molded thermoplastic foam articles are particularly useful when thermal or sound insulation is a desired property. The laminate provides three-dimensional rigidity over a wide temperature range.

This thermoformable laminate sheet is particularly useful in preparing headliners for automobiles where the laminate provides for noise attenuation within the automobile. A particular useful headliner can be prepared by utilizing two laminate sheets prepared according to this invention as covers for an inner core of a third polymeric foam, for instance a 250 mil (6.35 mm) thick, soft polyether, polyurethane foam. The three part composite can be prepared by using an adhesive on the bare surface of the laminate sheet to adhere to the soft, foam core. The composite has the acrylic emulsion adhered fabric on its outer surfaces which allows for thermoformability of the composite. One surface of the composite can be covered with a vinyl covered, soft foam trim for an aesthetic interior surface. Such automotive headliners are described in copending application Ser. No. 553,594.

While specific embodiments of the invention have been described, it should be apparent to those skilled in the art that various modifications thereof can be made without departing from the true spirit and scope of the invention. Accordingly, it is intended that the scope of the following claims cover all such modifications which fall within the full inventive concept.

We claim:
1. A moisture-resistant, moldable, thermoformable laminate structure comprising:
   (a) a layer of a substantially rigid foamed thermoplastic material, selected from the group consisting of polystyrene, styrene copolymers and polyethylene, said layer having first and second surfaces; and
   (b) a coating bonded to one of said surfaces; said coating being a polymer-impregnated cloth; wherein said polymer is a styrene-methacrylic acid copolymer having a softening temperature greater than approximately 75° C.

2. The laminate structure of claim 1 wherein the foamed thermoplastic material is selected from the group consisting of polystyrene, styrene-maleic anhydride polymer and styrene-acrylonitrile polymer.

3. The laminate structure of claim 2 wherein the layer of foamed thermoplastic material is a foamed polystyrene.

4. The laminate structure of claim 1 wherein said fabric is a woven cloth fabric.

5. The laminate structure of claim 1 wherein said cloth is a non-woven fabric.

6. The laminate structure of claim 5 wherein said non-woven cloth is a non-woven, spunbonded fabric.

* * * * *